United States Patent
Matsumaru et al.

(10) Patent No.: US 9,606,307 B2
(45) Date of Patent: Mar. 28, 2017

(54) OPTICAL MODULE

(71) Applicant: FUJIKURA LTD., Tokyo (JP)

(72) Inventors: Kohei Matsumaru, Sakura (JP); Satoshi Yamamoto, Sakura (JP); Hiroto Nakazato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/430,620

(22) PCT Filed: Sep. 2, 2013

(86) PCT No.: PCT/JP2013/073526
§ 371 (c)(1),
(2) Date: Mar. 24, 2015

(87) PCT Pub. No.: WO2014/050444
PCT Pub. Date: Apr. 3, 2014

(65) Prior Publication Data
US 2015/0260929 A1 Sep. 17, 2015

(30) Foreign Application Priority Data

Sep. 27, 2012 (JP) .................. 2012-214838

(51) Int. Cl.
*G02B 6/42* (2006.01)
*G02B 6/26* (2006.01)

(52) U.S. Cl.
CPC ............. *G02B 6/423* (2013.01); *G02B 6/428* (2013.01); *G02B 6/4214* (2013.01);
(Continued)

(58) Field of Classification Search
CPC .................................................. G02B 6/423
See application file for complete search history.

(56) References Cited

U.S. PATENT DOCUMENTS 5,214,308 A * 5/1993 Nishiguchi ............. H01L 23/13
228/180.22
6,114,221 A * 9/2000 Tonti ................. H01L 21/76898
257/686

(Continued)

FOREIGN PATENT DOCUMENTS

JP 2-277248 A 11/1990
JP 10-31138 A 2/1998
(Continued)

OTHER PUBLICATIONS

Communication dated Oct. 23, 2015 from the Intellectual Property Office of the P.R. China issued in corresponding Chinese application No. 201380049639.2.
(Continued)

*Primary Examiner* — Rhonda Peace
(74) *Attorney, Agent, or Firm* — Sughrue Mion, PLLC

(57) ABSTRACT

Object
To prevent deformation of locating pins and breakage of the glass substrate on which locating holes are formed.
Means for Solving the Problems
There is provided an optical module including: a glass substrate that includes an optical-electric-conversion element, that is transparent to either one of light emitted from the optical-electric-conversion element and light received by the optical-electric-conversion element, and in which a locating hole is formed; and an optical component in which a locating pin is formed, the glass substrate and the optical component being positioned by fitting the locating pin to the locating hole through a protective film so that the protective film is in contact with the locating hole and the locating pin.

14 Claims, 13 Drawing Sheets

(52) U.S. Cl.
CPC ......... *G02B 6/4259* (2013.01); *G02B 6/4292* (2013.01); *G02B 6/4246* (2013.01); *G02B 6/4284* (2013.01)

(56) References Cited

U.S. PATENT DOCUMENTS

| | | | |
|---|---|---|---|
| 6,188,138 B1 | 2/2001 | Bodo et al. | |
| 6,255,724 B1* | 7/2001 | Ambrosy | G02B 6/423 257/432 |
| 6,459,158 B1 | 10/2002 | Delprat et al. | |
| 6,533,391 B1* | 3/2003 | Pan | H01L 23/544 257/778 |
| 6,643,434 B2 | 11/2003 | Cayrefourcq et al. | |
| 7,063,467 B2* | 6/2006 | Nagasaka | G02B 6/4214 385/88 |
| 7,745,301 B2* | 6/2010 | Vora | H01L 23/544 257/777 |
| 7,907,803 B2* | 3/2011 | Hodono | G02B 6/1221 156/305 |
| 7,964,964 B2* | 6/2011 | Sheats | H01L 21/4867 257/737 |
| 8,265,436 B2* | 9/2012 | Shih | G02B 6/423 257/E33.056 |
| 8,842,952 B2* | 9/2014 | Tanaka | G02B 6/42 385/14 |
| 8,957,511 B2* | 2/2015 | Vora | H01L 24/81 257/678 |
| 2003/0039431 A1* | 2/2003 | Griese | G02B 6/04 385/15 |
| 2004/0067015 A1 | 4/2004 | Nakajima et al. | |
| 2004/0184737 A1 | 9/2004 | Oono et al. | |
| 2004/0234210 A1 | 11/2004 | Nagasaka et al. | |
| 2005/0105860 A1* | 5/2005 | Oono | G02B 6/4206 385/88 |
| 2011/0229083 A1* | 9/2011 | Dainese J nior | G02B 6/3869 385/74 |
| 2011/0280511 A1* | 11/2011 | Shih | G02B 6/4238 385/14 |
| 2014/0064675 A1* | 3/2014 | Tanaka | G02B 6/42 385/89 |
| 2014/0328561 A1* | 11/2014 | Tanaka | G02B 6/42 385/88 |
| 2015/0260929 A1* | 9/2015 | Matsumaru | G02B 6/4214 385/52 |

FOREIGN PATENT DOCUMENTS

| | | |
|---|---|---|
| JP | 10-206699 A | 8/1998 |
| JP | 2000-288904 A | 10/2000 |
| JP | 2001-506415 A | 5/2001 |
| JP | 2002-174742 A | 6/2002 |
| JP | 2003-131080 A | 5/2003 |
| JP | 2003-523085 A | 7/2003 |
| JP | 2004-240220 A | 8/2004 |
| JP | 2004-333692 A | 11/2004 |
| JP | 2005-17684 A | 1/2005 |
| JP | 2005-84165 A | 3/2005 |
| JP | 2006-98608 A | 4/2006 |
| JP | 2008-241495 A | 10/2008 |
| JP | 2012214838 A | 11/2012 |
| JP | 2013-134347 A | 7/2013 |
| JP | 2013-134348 A | 7/2013 |
| WO | 2013/099415 A1 | 7/2013 |

OTHER PUBLICATIONS

Communication dated May 12, 2015 from the Japanese Patent Office in counterpart application No. 2014-538313.

International Search Report for PCT/JP2013/073526 dated Oct. 8, 2013.

Communication dated Sep. 29, 2015 from the Japanese Patent Office in counterpart application No. 2014-538313.

Communication, dated May 3, 2016, from the State Intellectual Property Office of the P.R.C., in counterpart Chinese application No. 201380049639.2.

* cited by examiner (FIRST EMBODIMENT)

(REFERENCE EXAMPLE)

(FIRST EMBODIMENT)

(FIRST REFERENCE EXAMPLE)

(SECOND REFERENCE EXAMPLE)

OPTICAL MODULE

CROSS REFERENCE TO RELATED APPLICATIONS

This application is a National Stage of International Application No. PCT/JP2013/073526 filed Sep. 2, 2013, claiming priority based on Japanese Patent Application No. 2012-214838 filed Sep. 27, 2012, the contents of all of which are incorporated herein by reference in their entirety.

TECHNICAL FIELD

The invention relates to an optical module.

BACKGROUND ART

In the field of high-speed optical communications using optical fibers, optical transceivers are used as a device which converts electrical signals and optical signals into each other. Specifications (shape, dimension, pin assignment, etc.) of pluggable optical transceivers are standardized by Multi Source Agreements (MSAs) specified by employers' organizations of optical transceivers. With such pluggable optical transceivers, an optical module including an optical-electric-conversion element and a circuit board is removably plugged into a cage which is placed on a main board of the communication-equipment side (the host side). When the optical module is plugged into the cage, the circuit board in the optical module is electrically and mechanically connected to an electrical interface connector in the cage. This enables the optical-electric-conversion element or the circuit board in the optical module to convert the following signals into each other: the optical signals transmitted by the optical fiber; and the electrical signals processed by the main board of the communication-equipment side.

Patent Literature 1 describes an optical module in which the alignment of optical axes thereof is adjusted by inserting a locating pin into a board on which a locating hole is formed.

CITATION LIST

Patent Literature

Patent Literature 1: Japanese Patent Application Laid-open Publication No. 2005-17684

SUMMARY OF THE INVENTION

Technical Problem

In Patent Literature 1, polyimide resin is used for the board. It is, however, considered that employing a glass substrate as a board on which an optical-electric-conversion element is mounted enables to be transparent to light and to prevent alteration caused by heat.

When a locating hole is formed on a glass substrate by processing, a damage layer including minute irregularities (such as minute defects called as "chipping") or cracks is formed on the locating hole. Accordingly, when a locating pin comes into contact with a damage layer of the locating hole in the glass substrate, the damage layer is subject to stress from the pins, and the glass substrate may be broken, which originates from minute irregularities or cracks. Or, the minute irregularities on the locating hole may deform the locating pin and may impair positioning accuracy.

It is an object of the invention to prevent deformation of locating pins and breakage of the glass substrate on which locating holes are formed.

Solution to Problem

An aspect of the invention to achieve the above advantage is an optical module including: a glass substrate that includes an optical-electric-conversion element, that is transparent to either one of light emitted from the optical-electric-conversion element and light received by the optical-electric-conversion element, and in which a locating hole is formed; and an optical component in which a locating pin is formed, the glass substrate and the optical component being positioned by fitting the locating pin to the locating hole through a protective film so that the protective film is in contact with the locating hole and the locating pin.

Other features of the invention will become clear through the following description and the accompanying drawings.

Effects of the Invention

According to the invention, deformation of locating pins and breakage of the glass substrate on which locating holes are formed can be prevented.

MODE FOR CARRYING OUT THE INVENTION

Figure 1:
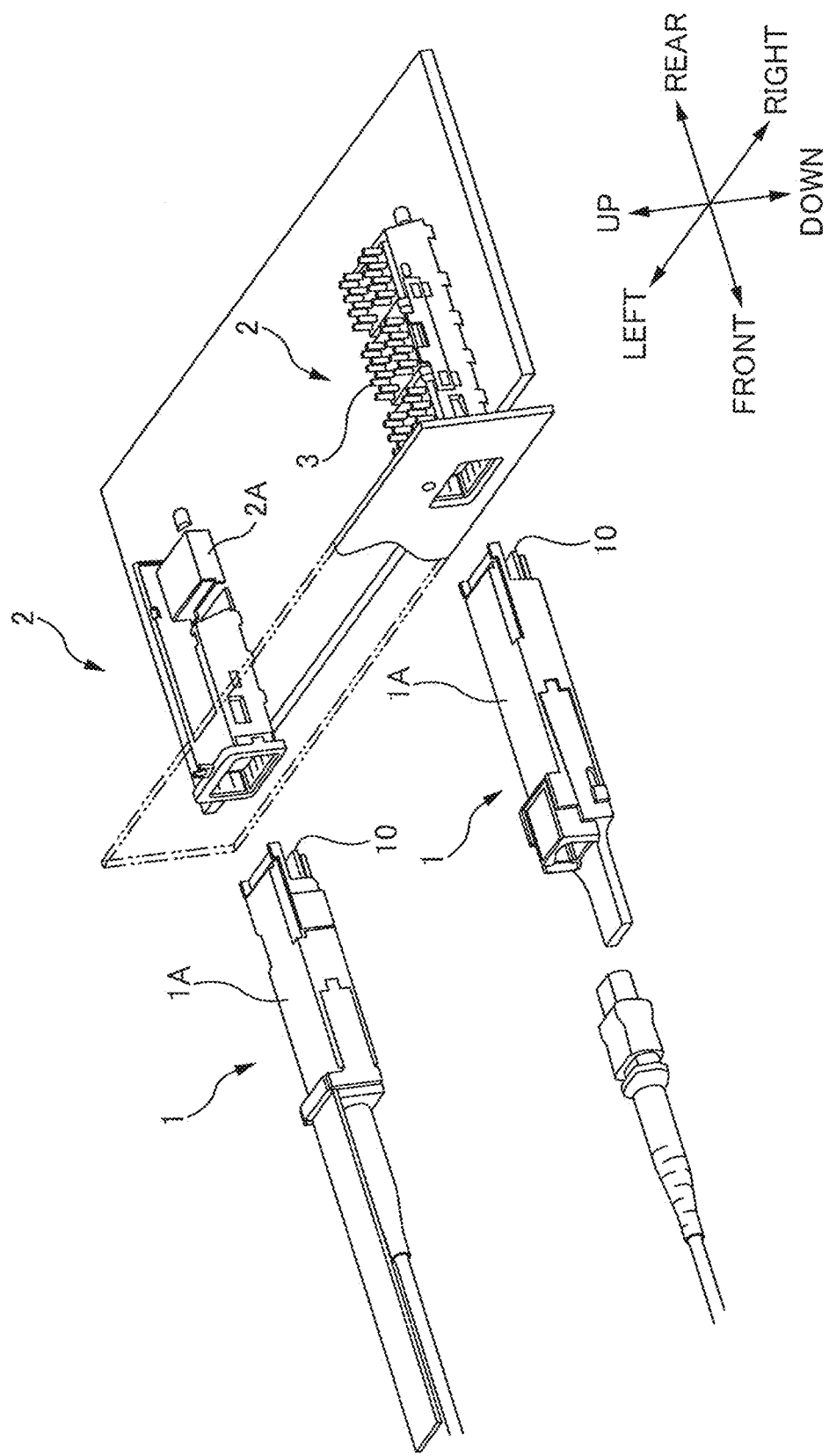
FIG. 1 is an explanatory diagram of a pluggable optical transceiver.

At least the following matters will be made clear by the description of the present specification and the accompanying drawings.

An optical module including:
a glass substrate
that includes an optical-electric-conversion element,
that is transparent to either one of light emitted from the optical-electric-conversion element and light received by the optical-electric-conversion element, and
in which a locating hole is formed; and an optical component in which a locating pin is formed,
the glass substrate and the optical component being positioned by fitting the locating pin to the locating hole through a protective film so that the protective film is in contact with the locating hole and the locating pin. With such an optical module, breakage of the glass substrate on which locating holes are formed and deformation of locating pins can be prevented.

It is desirable that the locating pin is fitted to the locating hole through the protective film, the protective film being formed beforehand on an edge of the locating hole of the glass substrate. This enables the locating pin to be fitted to the locating hole through the protective film so that the protective film is in contact with the locating hole and the locating pin.

It is desirable that irregularities of the glass substrate on the edge of the locating hole are covered by the protective film, and that an opening of the locating hole is composed of the protective film. This makes it possible to further prevent breakage of the glass substrate on which the locating hole is formed and deformation of the locating pin.

It is desirable that the protective film is resin film. This enlarges the region which is subject to stress, and this makes it possible to prevent breakage of the glass substrate and deformation of the locating pin.

It is desirable that the protective film is resin film that is formed together with a passivation film of the glass substrate. This simplifies the forming process of the protective film.

It is desirable that a through via is formed on the glass substrate, and that the protective film is formed by means in which film is laminated on the glass substrate by vacuum lamination. It is thereby possible to form a layer of film along the contour of the locating hole.

It is desirable that the protective film is metal film. This can assure the thickness of the protective film on the edge of the locating hole.

It is desirable that the protective film is metal film that is formed together with wiring of the glass substrate. This simplifies the forming process of the protective film.

It is desirable that the locating hole is a non-through hole and that the protective film is not formed on a bottom of the locating hole. Accordingly, the top of the locating pin becomes less likely to be in contact, and positioning accuracy improves.

It is desirable that the protective film is formed by forming a photosensitive resin layer on a surface of the glass substrate on which the locating hole is formed and by exposing and developing the resin layer. It is therefore easy to remove the protective film from the bottom of the locating hole.

It is desirable that the protective film is formed on an inner surface of the locating hole. This makes it possible to further prevent the glass substrate from being damaged.

It is desirable that in the optical component, a recess is formed around a root of the locating pin, and that the protective film formed on the surface of the glass substrate is placed between the glass substrate and the recess of the optical component. Accordingly, a space between the glass substrate and the optical component is not affected by the thickness of the protective film.

It is desirable that the locating hole is a tapered non-through hole, and the locating pin has a truncated cone shape. This makes it possible to very accurately position the glass substrate and the optical component.

It is desirable that the locating pin has a tapered surface, that an edge of the locating hole is chamfered, and that the protective film is in contact with the tapered surface of the locating pin and the chamfered surface of the locating hole. This enlarges the area where the protective film and the edge of the locating hole are in contact, which can prevent the glass substrate from being damaged.

It is desirable that a coefficient of linear expansion of the glass substrate is different from a coefficient of linear expansion of the optical component. This will be effective in the foregoing case.

First Embodiment

Overall Configuration

FIG. 1 is an explanatory diagram of a pluggable optical transceiver. Though a device which includes both of an optical transmitter and an optical receiver is called as an optical transceiver, in this embodiment, a device which includes either one of them is also called as an optical transceiver. The pluggable optical transceiver in the drawing is a QSFP transceiver (QSFP: Quad Small Form Factor Pluggable) specified by a Multi Source Agreement (MSA). The pluggable optical transceiver includes optical modules 1 and cages 2.

In the drawing, two types of the optical module 1 are illustrated. As shown in the drawing, optical fibers (including optical fiber cords) of the optical module 1 may be fixed to the module 1 or may be removable. As for the one of the two cages 2 in the drawing, in order to show the inside, a heat sink 3 is removed from it and is shown in a partially cutaway view.

In the description below, front, rear, up, down, left and right are defined as indicated in FIG. 1. That is, of the cages 2, the side into which the optical module 1 is plugged is defined as "front", and the opposite side as "rear". Of the optical module 1, the side to which the optical fibers (including optical fiber cords) extend is defined as "front" and the opposite side as "rear". When viewed from a main board on which the cages 2 are placed, the side on which there is the surface on which the cages 2 are placed is defined as "up", and the opposite side as "down". The direction perpendicular to the front-rear direction and the up-down direction is defined as a "left-right direction".

On the main board on the communication-equipment side (the host side), each cage 2 is placed. The cage 2 is placed on a main board, for example, of a blade server in a data center.

The optical module 1 is removably plugged into the cage 2. The optical module 1 includes an optical-electric-conversion element 31, a circuit board 10, etc. in a housing 1A, and converts the following signals into each other: the optical signals transmitted by the optical fibers; and the electrical signals processed by the main board of the communication-equipment side.

Each cage 2 removably accommodates the optical module 1. The cage 2 is a box member elongated in the front-rear direction and has a rectangular cross section. And, the cage 2 has an insertion opening, on the front side, into which the optical module 1 is plugged. The cage 2 is made by bending a metal plate so that the front side of the cage 2 is open. The metal plate is bent so as to have a rectangular cross section, and an accommodating section for accommodating the optical module 1 is formed in the cage 2. On the rear side in the cage 2, a connector 2A is provided. When the optical module 1 is plugged into the cage 2, the circuit board in the optical module 1 is connected electrically and mechanically to the connector 2A in the cage 2. And, electrical signals are transmitted between the optical module 1 and the main board.

On the upper surface of the cage 2, there is an opening, and the heat sink 3 is disposed so as to close the opening. The heat sink 3 includes a large number of radiating fins (radiating pins) which are for radiating out heat of the optical module 1 which is plugged into the cage 2.

Internal Structure of Optical Module 1

Figure 2A:
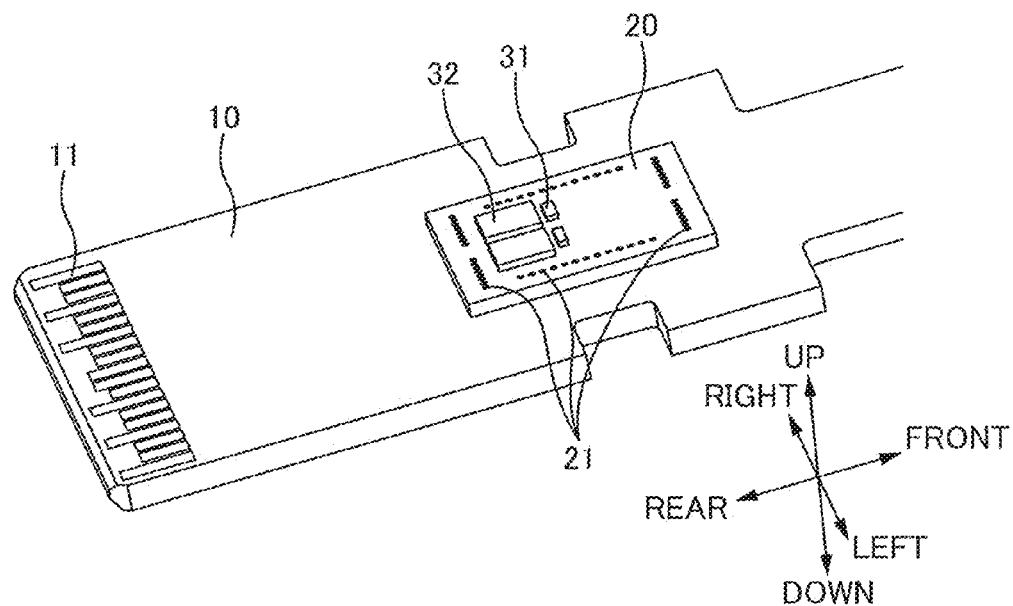
FIG. 2A is a perspective view of the circuit board 10, etc. in the housing 1A of an optical module 1 seen obliquely from above.
Figure 2B:
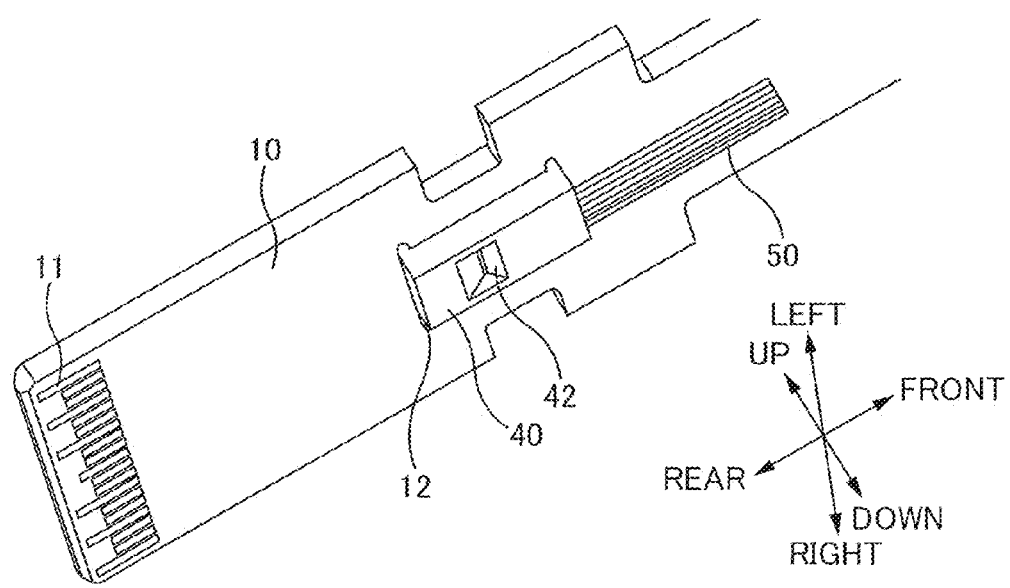
FIG. 2B is a perspective view of the circuit board 10, etc. seen obliquely from below.
Figure 3:
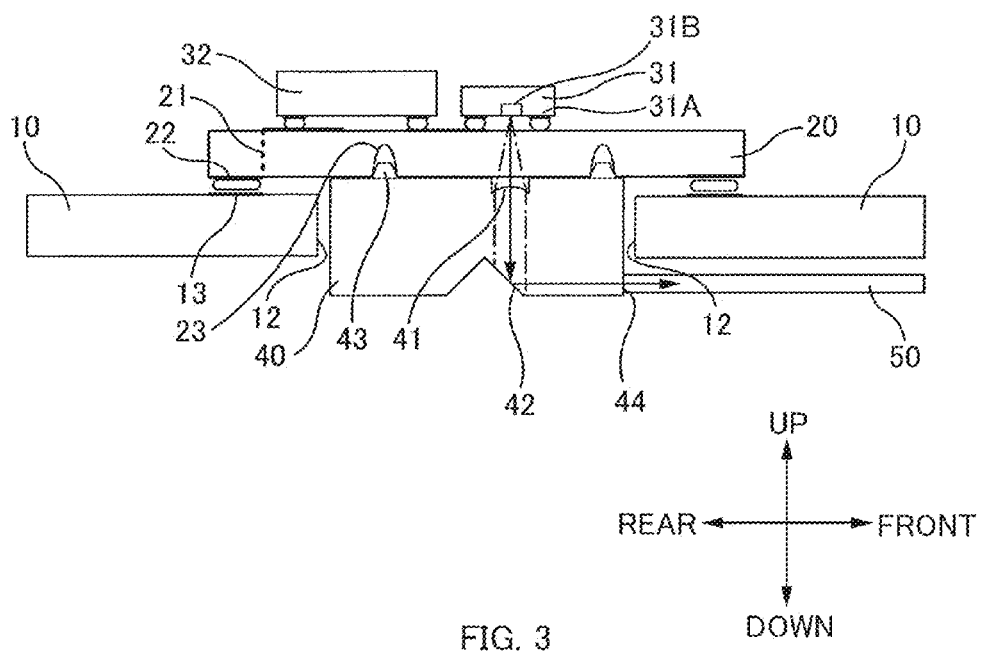
FIG. 3 is a schematic diagram of the configuration of the optical module 1 plugged into a cage 2.

FIG. 2A is a perspective view of the circuit board 10, etc. in the housing 1A of the optical module 1 seen obliquely from above. FIG. 2B is a perspective view of the circuit board 10, etc. seen obliquely from below. FIG. 3 is a schematic diagram of the configuration of the optical module 1 plugged into the cage 2.

As shown in drawings, the optical module 1 includes, in the housing 1A, the circuit board 10, a glass substrate 20 and an optical-path changer 40.

The circuit board 10 is a printed wiring board which configures an electronic circuit, in the form of a plate. On the rear end of the circuit board 10, a connecting section 11 (a card edge connector) is formed, which is for connecting to the connector 2A (connector socket) in the cage 2. The connecting section 11 is provided on the upper and lower surfaces of the circuit board 10, and has many terminals which are arranged in the left-right direction.

In the circuit board 10, a receiving window 12 for receiving the optical-path changer 40 therein is formed. On the upper surface of the circuit board 10, circuit-board-side electrodes 13 are formed so as to surround the receiving window 12. Also, on the upper surface of the circuit board 10, the glass substrate 20 is mounted so as to cover the receiving window 12. In other words, the receiving window 12 of the circuit board 10 is located below the glass substrate 20, and the receiving window 12 of the circuit board 10 is covered with the lower surface of the glass substrate 20. On the lower surface of the glass substrate 20, glass-substrate-side electrodes 22 are formed. The glass substrate 20 is mounted on the circuit board 10 so that the substrate 20 covers the receiving window 12 of the circuit board 10 whereas the glass-substrate-side electrodes 22 connect to the circuit-board-side electrodes 13.

The receiving window 12 is a through hole (an opening) formed in the circuit board 10. Into the receiving window 12, the upper part of the optical-path changer 40 is inserted. The lower part of the optical-path changer 40 protrudes downwards from the receiving window 12, and the optical fibers 50 extend toward the front from this protrusion. However, if the optical-path changer 40 is thinner than the circuit board 10, the lower part of the optical-path changer 40 does not protrude downwards from the receiving window 12. In this case, if a reflecting section 42 is configured so as to reflect light at an obtuse angle, this makes it easier to withdraw the optical fibers 50 from the optical-path changer 40.

The glass substrate 20 is a transparent substrate which is made of glass and is transparent to light. The glass substrate 20 is composed of glass materials such as silica glass and borosilicate glass; in this embodiment, borosilicate glass is employed. The glass substrate 20 has a plurality of through vias 21 which are formed along the contour of the receiving window 12 of the circuit board 10.

On the lower surface of the glass substrate 20 (the surface on the side opposite to the surface on which light-emitting sections 31 are mounted), the glass-substrate-side electrodes 22 are formed. The glass-substrate-side electrodes 22 are disposed outside the through via 21 and are formed along the contour of the receiving window 12 of the circuit board 10. The glass-substrate-side electrodes 22 electrically connect to the circuit-board-side electrodes 13 which are formed on the upper surface of the circuit board 10. The through vias 21 are used for wiring between the glass-substrate-side electrodes 22 and the followings: light-emitting sections 31 and drive elements 32.

On the lower surface of the glass substrate 20, two locating holes 23 for positioning the optical-path changer 40 are formed. These locating holes 23 do not extend through the glass substrate 20, and are non-through holes. If the locating holes 23 are non-through holes, a component (e.g., the drive element 32) can be mounted above the locating holes 23 and the component can also be wired. This increases flexibility in components and wiring on the upper surface of the glass substrate 20. This makes it possible to reduce the glass substrate 20.

On the upper surface of the glass substrate 20, the light-emitting sections 31 are mounted. The drive elements 32 for driving the light-emitting sections 31 are mounted on the upper surface of the glass substrate 20 (the surface on which the light-emitting sections 31 are mounted). The light-emitting sections 31 and the drive elements 32 are disposed on the inner side than the through vias 21 are. In other words, the light-emitting sections 31 and the drive elements 32 are mounted on the upper surface of the glass substrate 20 so as to be located above the receiving window 12 of the circuit board 10.

The light-emitting sections 31 are each an optical-electric-conversion element which converts optical signals and electrical signals. In this embodiment, as the light-emitting section 31, a Vertical Cavity Surface Emitting Laser (VCSEL) which emits light perpendicular to a board is employed. As the optical-electric-conversion element, a light-receiving section which converts optical signals into electrical signals may be mounted on the glass substrate 20. Also, the light-emitting section and the light-receiving section both may be mounted on the glass substrate 20.

The light-emitting-section-side electrodes 31A and the light-emitting surface 31B of each light-emitting section 31 are formed on the lower surface (the surface facing to the glass substrate 20). The light-emitting section 31 is mounted on the glass substrate 20 by flip-chip bonding and emits light toward the glass substrate 20. Since the light-emitting-section-side electrodes 31A and the light-emitting surface 31B of the light-emitting section 31 are located on the same side (the lower surface which faces the glass substrate 20), if the light-emitting section 31 is mounted on the glass substrate 20 by flip-chip bonding, the light-emitting surface 31B faces toward the glass substrate 20 and is not exposed to the outside.

Though one light-emitting surface 31B of the light-emitting section 31 is illustrated in FIG. 3, the light-emitting section 31 includes a plurality of (e.g. four) light-emitting surfaces 31B lined in a direction perpendicular to the plane of the paper.

The optical-path changer 40 is an optical component which changes the optical path of light emitted from the light-emitting section 31. In addition, the optical-path changer 40 serves as a support member which supports an end of each optical fiber 50, and the optical-path changer 40 forms, in corporation with the transparent substrate, the optical path between the light-emitting section 31 and the optical fibers 50. The optical-path changer 40 is positioned in relation to the glass substrate 20. The optical-path changer 40 is inserted into the receiving window 12 from the bottom of the circuit board 10.

The optical-path changer 40 includes a lens section 41 and a reflecting section 42. The lens section 41 is formed on the upper surface of the optical-path changer 40, and the reflecting section 42 is formed on the lower surface of the optical-path changer 40.

The lens section 41 is a section in a form of a convex lens for focusing light. However, in order not to protrude from the upper surface of the optical-path changer 40, the lens section 41 is formed in a recess recessed in the upper surface. By forming the lens section 41 which is recessed in the upper surface of the optical-path changer 40, the upper surface of the optical-path changer 40 and the lower surface of the glass substrate 20 can be in surface-to-surface contact with each other. The lens section 41 focuses light emitted by the light-emitting section 31 and leads it to the reflecting section 42, light enters the optical fibers 50. If the light-receiving section is mounted on the glass substrate 20, the lens section 41 focuses the light reflected from the reflecting section 42 into the light-receiving section. The lens section 41 faces the light-emitting surface 31B of the light-emitting section 31 through the glass substrate 20.

The reflecting section 42 is a section for reflecting light. Whereas the optical axis of the light emitted from the light-emitting section 31 is in the up-down direction (a direction perpendicular to a board such as the circuit board 10 and the glass substrate 20), the optical axis of the light reflected from the reflecting section 42 is in the front-rear direction (a direction parallel to a board such as the circuit board 10 and the glass substrate 20). The light reflected from the reflecting section 42 enters the optical fibers 50 which are attached to the optical-path changer 40. If the light-receiving section is mounted on the glass substrate 20, the reflecting section 42 reflects light emitted from the optical fibers 50, leads the light to the lens section 41, and focuses the light into the light-receiving section.

In the reflecting section 42 illustrated in the drawing, the optical axis of the reflected light is in the front-rear direction (a direction parallel to a board such as the circuit board 10 and the glass substrate 20). However, the reflecting section 42 is not limited to one which reflects light at 90 degrees. The reflecting section 42 may reflect light at an obtuse angle (e.g., approximately 100 degrees). it is sufficient that the light whose optical axis is in the up-down direction (a direction perpendicular to a board such as the circuit board 10 and the glass substrate 20) is reflected so as to have a component of the front-rear direction (a direction parallel to a board such as the circuit board 10 and the glass substrate 20). for example, if the roots of the optical fibers 50 are placed in a relatively upper part of the optical-path changer 40, or if the thickness of the optical-path changer 40 is thinner than the thickness of the circuit board 10, it is preferable that the reflecting section 42 is configured to reflect light at an obtuse angle in order to make it easier to withdraw the optical fibers 50 from the optical-path changer 40.

The optical fibers 50 are disposed in alignment so that the lens section 41 is located at a predetermined position relative to the reflecting section 42 of the optical-path changer 40.

In the optical-path changer 40 illustrated in the drawing, the lens section 41 is disposed in apart which light enters. However, the optical-path changer 40 may include two lens sections one of which is disposed in a part which emits light. If two lens sections are collimator lenses, the optical-path changer 40 can cause parallel rays to propagate therein.

On the upper surface of the optical-path changer 40, two locating pins 43 which are inserted into the locating holes 23 of the glass substrate 20 are formed in a protruding manner. The locating pins 43 of the optical-path changer 40 are fitted to the locating hole 23 of the glass substrate 20, and thereby the following optical axes are aligned: the optical axis of the lens section 41 of the optical-path changer 40; and the optical axis of the light-emitting section 31 which is mounted on the glass substrate 20.

The optical-path changer 40 is made of resin being formed as a single piece. That is, the lens section 41, the reflecting section 42 and a locating pin 43 of the optical-path changer 40 is made of resin and is formed as a single piece. The optical-path changer 40 is made of resin which is transparent to light, and polyetherimide resin is used here.

The optical-path changer 40 is relatively thick compared to other components in order to have a size to fit the dimensions of the reflecting section 42, or in order to have a size to fit the space in which the ends of the optical fibers 50 are connected. Since the upper part of the thick optical-path changer 40 is placed within the receiving window 12, it is possible to reduce the height of the optical module compared to a case in which the circuit board 10, the glass substrate 20 and the optical-path changer 40 are merely stacked (or a case in which the glass substrate 20 and the optical-path changer 40 are attached to the circuit board 10 with a relay board).

Figure 4A:
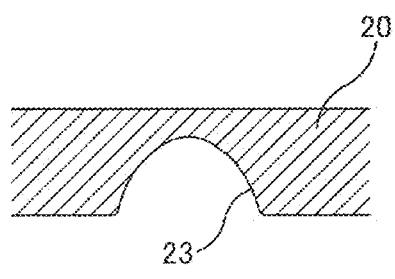
FIG. 4A is an explanatory diagram of a locating hole 23 according to the first embodiment.
Figure 4B:
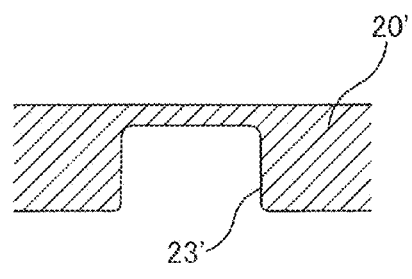
FIG. 4B is an explanatory diagram of a locating hole 23' of a reference example.

Shape of Locating Hole 23 and Locating Pin 43 FIG. 4A is an explanatory diagram of the locating hole 23 according to the first embodiment. FIG. 4B is an explanatory diagram of a locating hole 23' of a reference example. In the first embodiment, non-through holes are formed on the glass substrate 20 as the locating hole 23. This reason is that, if the locating holes 23 are non-through holes, flexibility in components and wiring on the upper surface of the glass substrate 20 increases.

As a method for forming a non-through hole on the glass substrate 20, drilling can be considered. When a non-through hole is formed by drilling, the hole formed on the glass substrate 20' has a uniform diameter at all depths, as shown in FIG. 4B; but, drilling is expensive. And, in the first embodiment, sandblasting, by which non-through hole can be formed at low cost, is used. However, non-through holes formed by sandblasting have a tapered shape (see FIG. 4A).

Figure 5A:
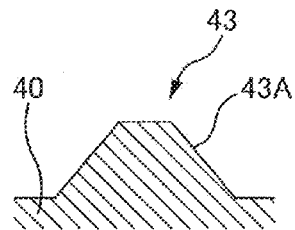
FIG. 5A is an explanatory diagram of a locating pin 43 according to the first embodiment.
Figure 5B:
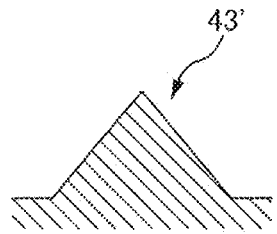
FIG. 5B is an explanatory diagram of a locating pin 43' of the first reference example.

FIG. 5A is an explanatory diagram of the locating pin 43 according to the first embodiment. FIG. 5B is an explanatory diagram of a locating pin 43' of the first reference example.

Figure 5C:
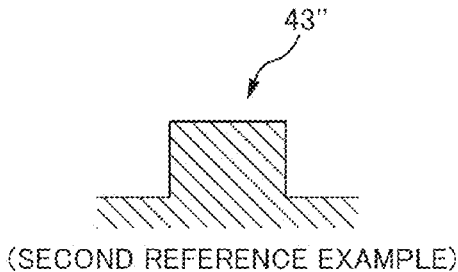
FIG. 5C is an explanatory diagram of a locating pin 43" of the second reference example.

FIG. 5C is an explanatory diagram of a locating pin 43" of the second reference example.

The locating pin 43" of the second reference example shown in FIG. 5C is in a cylindrical shape having a uniform pin diameter (a cylindrical shape of uniform diameter). In the case of the cylindrical locating pin 43", it is impossible to perform the positioning by inserting the pin 43" into the tapered locating hole 23, which is shown in FIG. 4A. If the locating hole 23 has a shape as shown in FIG. 4B, it may be possible to perform the positioning by inserting the locating pin 43" of the second reference example shown in FIG. 5C. But, in this case, space between the locating hole 23' and the locating pin 43" is needed due to tolerance, and this space causes alignment error.

The locating pin 43' of the first reference example shown in FIG. 5B is conical. If the locating pin 43' of this shape is inserted into the tapered locating hole 23 as shown in FIG. 4A, the tip end of the locating pin 43' may come into contact with the bottom of the locating hole 23 and this makes it impossible to perform the positioning. Though it is possible to reduce the height of the locating pin 43' of the first reference example so that the tip end of the locating pin 43' does not come into contact with the bottom of the locating hole 23, the angle of the tapered surface becomes small (the overall shape of the locating pin 43' is flat). In this case, it is possible that misalignment of the optical axes occurs because of the following reasons; it becomes difficult to insert the pin 43' into the locating hole 23; fitting of the locating hole 23 impairs; and the like.

As opposed thereto, the locating pin 43 of the first embodiment has a truncated cone shape as shown in FIG. 5A. Even though the locating pin 43 of a truncated cone shape is inserted into the tapered locating hole 23 as shown in FIG. 4A, the tip end of the locating pin 43 is less likely to come into contact with the bottom of the locating hole 23. If an angle of a tapered surface 43A having a truncated cone shape is enlarged, the tip end of the locating pin 43 is also less likely to come into contact with the bottom of the locating hole 23.

With the locating pin 43 of the first embodiment, the tapered surface 43A having a truncated cone shape can be in contact with the opening of the locating hole 23 without space (can be in contact with the edge of the locating hole 23 without space). This makes it possible to prevent alignment error in a direction perpendicular to the axial direction of the locating pin 43 (the axial direction of the locating hole 23). In addition, it is possible to prevent misalignment between the optical axis on the side of the glass substrate 20 (the optical axis of the light emitted by the light-emitting section 31) and the optical axis on the side of the optical-path changer 40 (the optical axis of the lens section 41). It should be noted that, when the truncated-cone-shaped locating pin 43 (or the conical locating pin 43') shown in FIG. 5A is used, misalignment in the axial direction of the locating pin 43 (the axial direction of the locating hole 23) may occur due to tolerance between the locating pin 43 and the locating hole 23. Misalignment in this direction, however, is allowable because misalignment in this direction does not cause misalignment between the optical axis on the side of the glass substrate 20 (the optical axis of the light emitted by the light-emitting section 31 and the optical axis on the side of the optical-path changer 40 (the optical axis of the lens section 41) and because the loss of light is therefore small.

For these reasons, in the first embodiment, the locating holes 23 (tapered non-through holes) shown in FIG. 4A and the truncated-cone-shaped locating pins 43 shown in FIG. 5A are used.

Figure 6A:
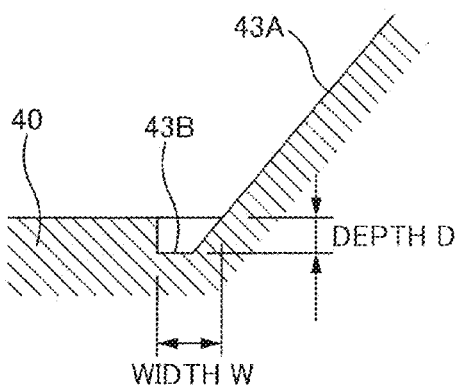
FIG. 6A is a magnified view of the root and its surroundings of the locating pin 43 of the first embodiment.
Figure 6B:
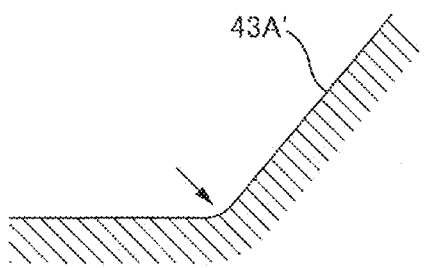
FIG. 6B is a magnified view of the root and its surroundings of the locating pin 43 of the reference example.

FIG. 6A is a magnified view of the root and its surroundings of the locating pin 43 of the first embodiment. FIG. 6B is a magnified view of the root and its surroundings of the locating pin 43 of the reference example.

Since shrinkage of resin usually occurs during molding, the outer shape of a resin molded product does not precisely show the inner shape of a mold. In some cases, a corner of a molded product is round, for example. As mentioned above, the optical-path changer 40 of the first embodiment is made of transparent resin being formed as a single piece, and the locating pins 43 are also formed as a single piece with other parts of the optical-path changer 40. As shown in the reference example of FIG. 6B, the root corner of the locating pin 43 (indicated by the arrows in the drawing) may be round. This round section is not formed uniformly in the peripheral of the locating pin 43 (it is not possible to control the degree of this roundness in the root of the locating pin 43). Contact of this section with the locating hole 23 therefore causes misalignment in a direction perpendicular to the axial directions of the locating hole 23 and the locating pin 43, and also may cause misalignment between the optical axis on the side of the glass substrate 20 (the optical axis of the light emitted by the light-emitting section 31) and the optical axis on the side of the optical-path changer 40 (the optical axis of the lens section 41).

As shown in FIG. 6A, in the first embodiment, an annular recess 43B is formed so as to surround the root of the locating pin 43. In addition, the inner side wall of the recess 43B is a surface which the tapered surface 43A of the locating pin 43 having a truncated cone shape extends. That is, the tapered surface 43A of the locating pin 43 is formed extending to the inside with respect to the upper surface of the optical-path changer 40 (to the side opposite to the side on which the locating pin 43 protrudes). The root corner of the locating pin 43 is therefore located inside with respect to the upper surface of the optical-path changer 40 even though the corner is round. This prevents the round root corner of the locating pin 43 from coming into contact with the locating hole 23.

Damage Layer of Locating Hole 23 and Protective Film

Figure 7B:
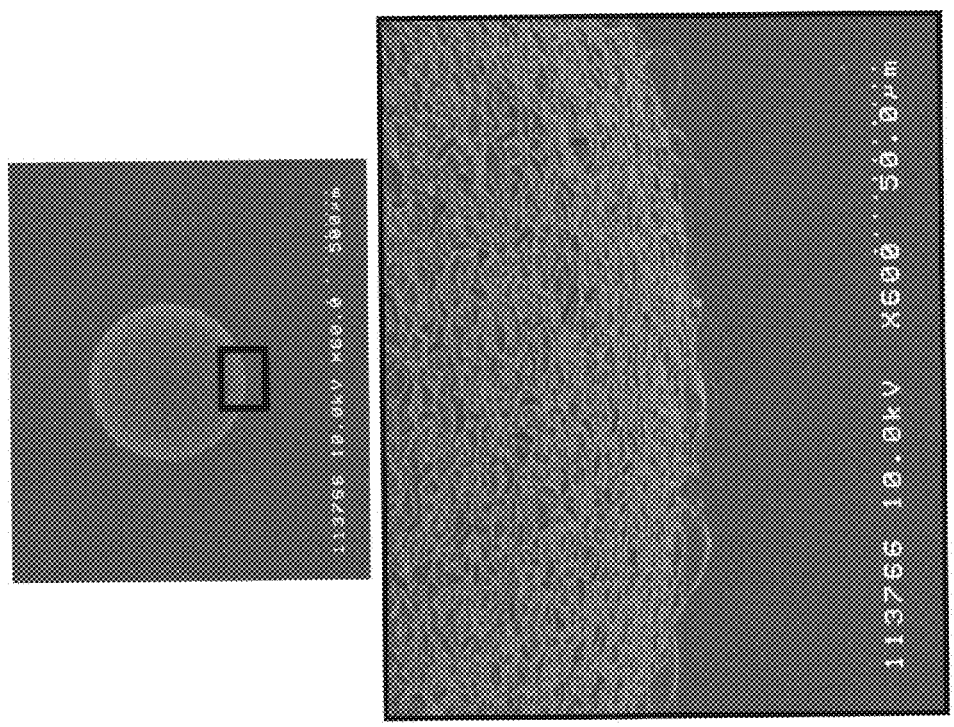
FIG. 7B is a magnified photograph of a non-through hole which is formed on a glass substrate 20 by sandblasting.
Figure 8B:
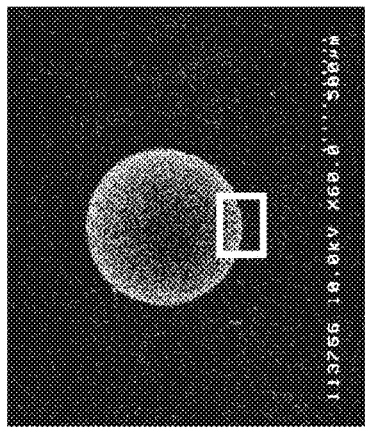
FIG. 8B is a binary image of FIG. 7B.
Figure 8B:
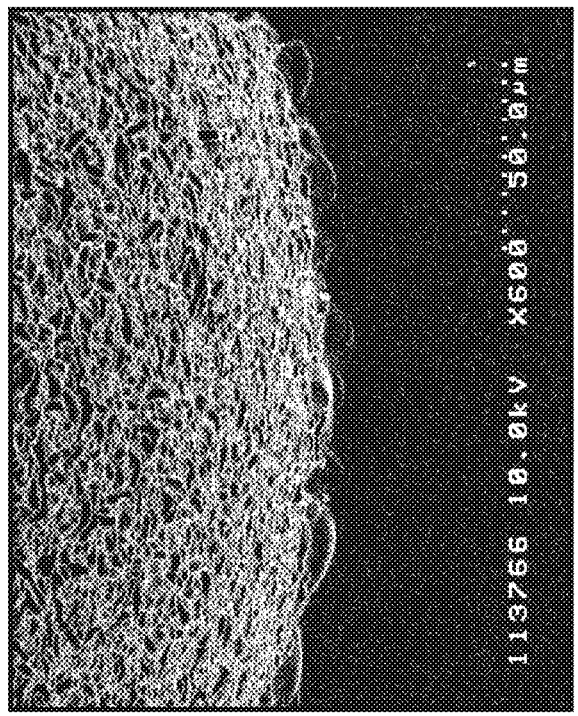

FIG. 7B is a magnified photograph of a non-through hole which is formed on the glass substrate 20 by sandblasting. FIG. 8B is a binary image of FIG. 7B. The lower photographs are magnified ones of the frames in the upper photographs, that is, magnified photographs of the edge of the hole. As shown in drawings, if the locating hole 23 is formed on the glass substrate 20 by sandblasting, minute irregularities called as chipping are formed on the inner surface of the locating hole 23. When the locating hole 23 is formed on the glass substrate 20 by processing, cracks or the like may be formed as well as minute irregularities, which are not shown in figures. In the description below, a region in which minute irregularities, cracks or the like are formed is referred to as a "damage layer". The damage layer is formed not only when the glass substrate 20 is processed by sandblasting, but also when the glass substrate 20 is processed by other polishing or cutting (e.g. drilling).

When the locating pin 43 having a truncated cone shape is inserted into the locating hole 23, the tapered surface 43A of the locating pin 43 comes into contact with the edge of the locating hole 23. On the other hand, as shown in the lower picture of FIG. 7B, damage layer is formed in the locating hole 23 and there are minute irregularities formed on the edge of the locating hole 23. When the locating pin 43 comes into contact with the edge of the locating hole 23, the damage layer is therefore subject to stress from the pin. It is possible that the glass substrate 20 is broken, which originates from minute irregularities or cracks of the damage layer.

Further, if the coefficient of linear expansion of the glass substrate 20 is different from the coefficient of linear expansion of the optical-path changer 40, when the temperature changes after the locating pin 43 is inserted into the locating hole 23, the edge of the locating hole 23 is subject to force from the locating pin 43. In this case, the locating hole 23 is also subject to stress from the pin, and it is possible that the glass substrate 20 is broken which originates from minute irregularities or cracks of the damage layer. In other words, the glass substrate 20 may be broken at the time of inserting the locating pin 43 into the locating hole 23, and also the glass substrate 20 to which the optical-path changer 40 after the inserting is fitted may be broken.

Figure 9:
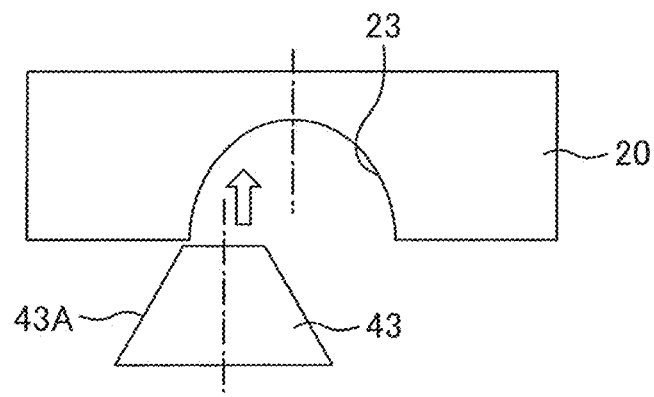
FIG. 9 is an explanatory diagram of misalignment caused by plastic deformation of the locating pin 43.
Figure 9:
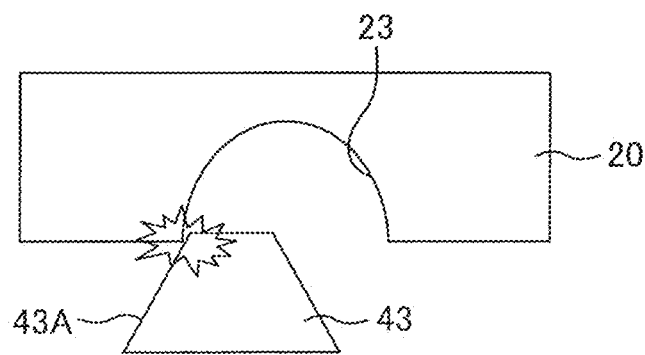
Figure 9:
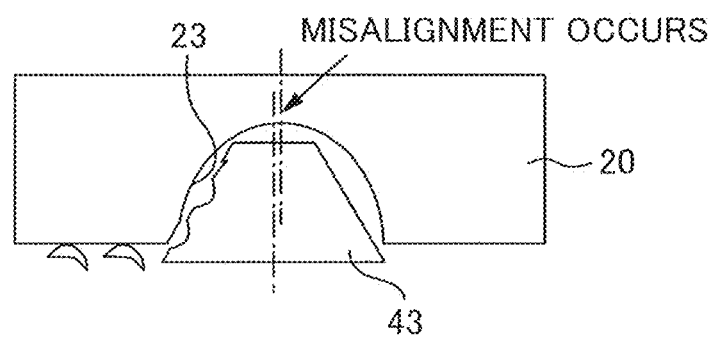

Further, if there are minute irregularities on the edge of the locating hole 23 as shown in FIGS. 7B and 8B, the locating pin 43 is likely to be ground and to be plastically deformed due to the edge of the locating hole 23 as shown in FIG. 9. The plastic deformation of the locating pin 43 causes misalignment the degree of which corresponds to the plastic deformation, which results in deterioration of positioning accuracy. Otherwise, because irregularities of the locating hole 23 engage in the part of the locating pin 43 which has been plastically deformed, the locating pin 43 is not sufficiently inserted into the locating hole 23, but the pin 43 is fixed to the hole 23. As a result, it is possible that positioning accuracy deteriorates.

Figure 7A:
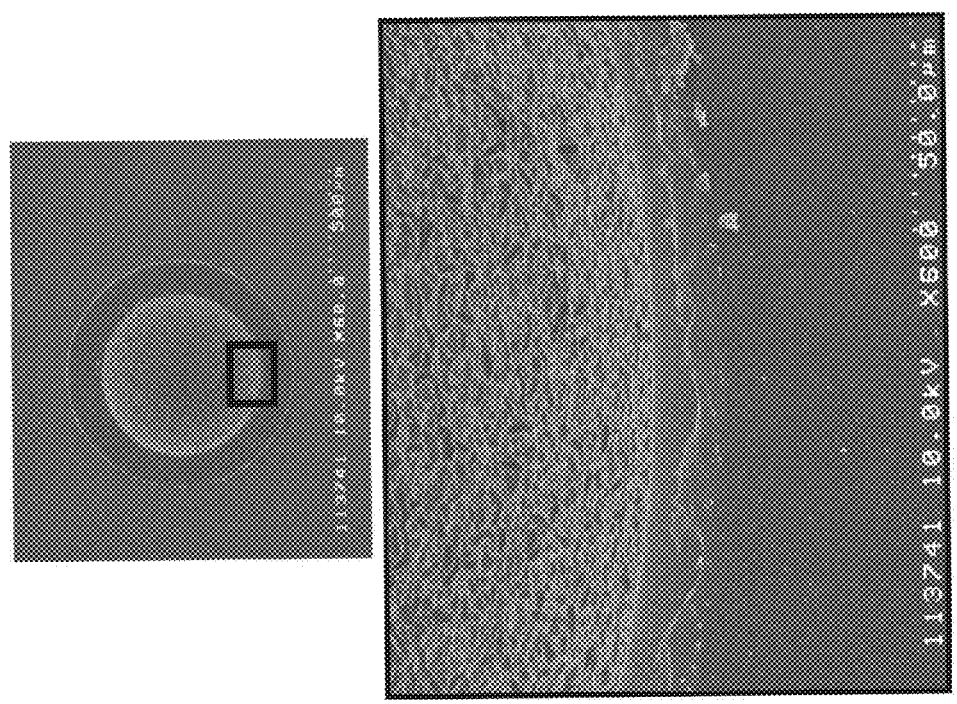
FIG. 7A is a magnified photograph of the protective film formed on a non-through hole of FIG. 7B.
Figure 8A:
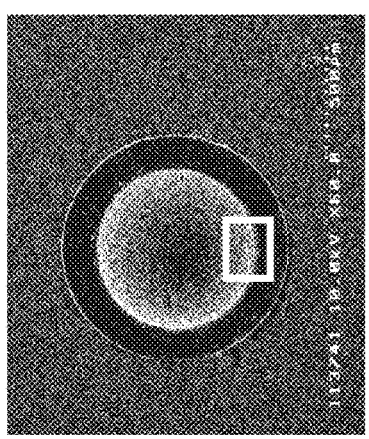
FIG. 8A is a binary image of FIG. 7A.
Figure 8A:
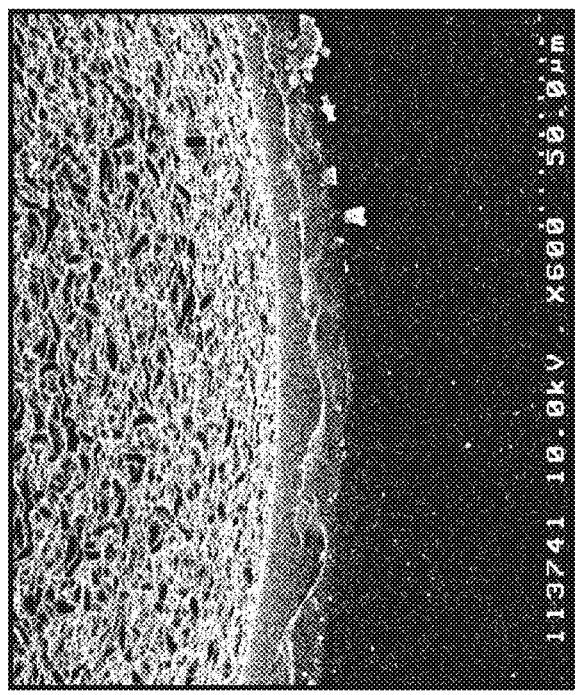

In the first embodiment, protective film is formed on the edge of the locating hole 23. FIG. 7A is a magnified photograph of the protective film which is formed on a non-through hole of FIG. 7B. FIG. 8A is a binary image of FIG. 7A. In this example, polyimide resin is used as the protective film. As shown in FIGS. 7A and 8A, the opening of the locating hole 23 on which the protective film is formed is smoother than the opening shown in FIG. 7B because damage layer (irregularities of the glass substrate 20 on the edge of the locating hole) of the opening is covered by the protective film. And, the protective film is formed more thickly than irregularities of the glass substrate 20 on the edge of the locating hole 23. That is, the opening of the locating hole 23 which is covered by the protective film is composed of the protective film alone. In other words, on the opening of the locating hole 23, irregularities of the glass substrate 20 do not protrude from the protective film. Accordingly, even if stress from the locating pin 43 is exerted, the protective film mitigates the stress and prevents breakage of the glass substrate 20 and deformation of the locating pin 43. It is therefore preferable that the material of the protective film is softer than the material of the glass substrate 20 and the material of the locating pin 43 of the optical-path changer 40; this is because the protective film serves as a cushion. It is also preferable that the protective film reduces the influence of irregularities on the edge of the locating hole 23, and it is more preferable that the protective film covers all irregularities of the glass substrate 20 on the edge of the locating hole 23.

Figure 10:
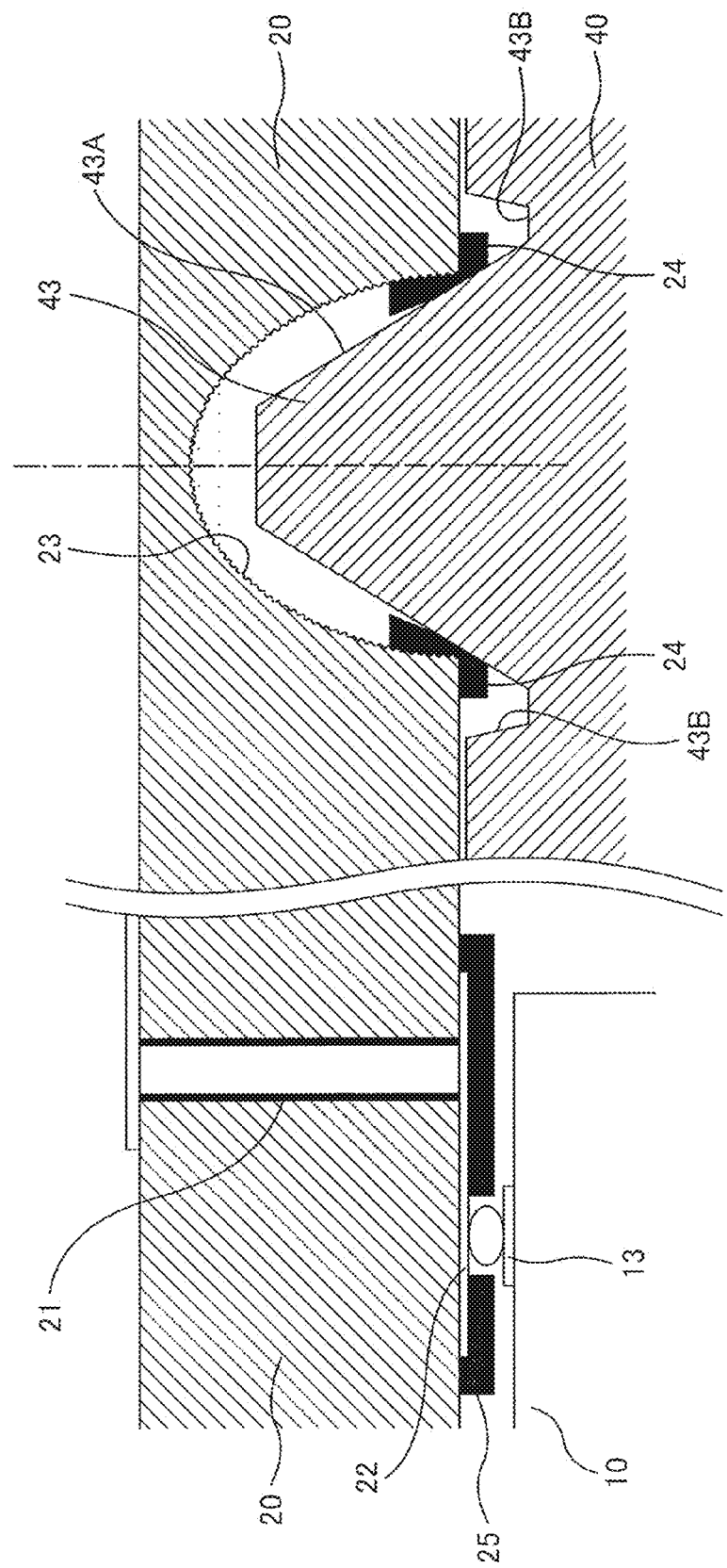
FIG. 10 is a magnified cross-sectional view of the first embodiment, showing the locating hole 23, the locating pin 43 and their surroundings, and a glass-substrate-side electrode 22 and its surroundings.

FIG. 10 is a magnified cross-sectional view of the first embodiment, showing the locating hole 23, the locating pin 43 and their surroundings, and the glass-substrate-side electrode 22 and its surroundings. As shown in the figures, the locating pin 43 is fitted to the locating hole 23 over a protective film 24 which is formed beforehand on the edge of the locating hole 23 in the glass substrate 20.

On the edge of the locating hole 23, the protective film 24 is formed. The protective film 24 is in contact with both of the locating hole 23 and the locating pin 43 on the edge of the locating hole 23, the locating pin 43 is fitted to the locating hole 23 through the protective film 24. In other words, the protective film 24 is sandwiched between the locating hole 23 and the locating pin 43. Though the protective film 24 is placed between the locating hole 23 and the locating pin 43, partial breakage of the protective film 24 may cause direct contact of the locating hole 23 and the locating pin 43.

In the case where the protective film 24 is formed on the edge of the locating hole 23, the stress to which the edge of the locating hole 23 is subject from the locating pin 43 is mitigated by the protective film 24, compared to the case without the protective film 24. In addition, the region on the edge of the locating hole 23 which is subject to stress is larger (the area which is subject to stress is larger). This prevents breakage of the glass substrate 20 and deformation of the locating pin 43.

On the glass substrate 20, passivation film 25 is formed. The passivation film 25 is film formed on a metal layer which constitutes the glass-substrate-side electrode 22, in order to protect the glass-substrate-side electrode 22. The passivation film 25 has an excellent ability to be in close contact with the glass-substrate-side electrode 22. In the case where the outermost surface of the glass-substrate-side electrode 22 is made of copper or gold, the following resins are employed: polyimide resin; silicone resin; epoxy resin; acrylic resin; and the like. Polyimide resin is used in these embodiments.

The protective film 24 is resin film (polyimide resin in these embodiments) and is formed together with the passivation film 25. This simplifies the forming process of the protective film 24. The forming process of the protective film 24 will be described below.

A layer of photosensitive resin is formed first on the metal layer constituting the glass-substrate-side electrode 22 and on the glass substrate 20 on which the locating hole 23 is formed. The photosensitive resin layer is for forming passivation films on a through via 21. Since the through via 21 is formed on the glass substrate 20, a layer of photosensitive resin is formed on the glass substrate 20 by laminating film photoresist material by vacuum lamination, not by applying liquid photoresist material to the glass substrate 20. The vacuum lamination makes it also possible to form the photosensitive resin layer on the inner surface of the locating hole 23. In this case, if the film is heated, a resin layer is formed along the contour of the locating hole 23. And, it is less likely to form a space between the film and the locating hole 23.

Next, the photosensitive resin layer on the glass substrate 20 is exposed to light in a pattern. At this time, in a region in which the passivation film 25 is formed, the resin layer is exposed to light in the pattern so that a window through which the glass-substrate-side electrode 22 is exposed is formed on the metal layer. Further, in a region in which the protective film 24 is formed, the resin layer is exposed to light in an annular pattern so that annular film is formed along the edge of the locating hole 23. The outside diameter of the annular pattern is larger than the diameter of the locating hole 23, and the inside diameter of the annular pattern is smaller than the diameter of the locating hole 23. If the diameter of the opening of the locating hole 23 is, for example, 500 μm, an annular pattern having an outside diameter of 550 μm and an inside diameter of 450 μm is formed. When the glass substrate 20 is developed after the exposure in the pattern, the protective film. 24 is formed together with the passivation film. 25 on the glass substrate 20.

In the description above, the passivation film 25 and the protective film 24 are made of photosensitive resin (polyimide resin). The passivation film 25 and the protective film 24 may however be made of non-photosensitive resin. In addition, the protective film 24 may be made of a different resin from the passivation film 25.

Though, in the description above, the protective film 24 is made of resin, the protective film 24 may be made of metal film. In this case, the metal film is formed by metal plating, the thickness of the protective film 24 is likely to be uniform on the edge of the locating hole 23. In addition, the protective film 24 does not become thin (on the other hand, if the protective film 24 is made of resin, resin is drawn into the recess of the locating hole 23. In this case, resin is likely to become thin on the edge of the locating hole 23 and the thickness of the film 24 is likely to become irregular). If the protective film is metal film, it is possible that the protective film separates from the glass substrate 20, which is caused by the difference in thermal expansion between glass and metal. However, the separation of the protective film from the glass substrate 20 is allowable if the locating pin 43 is inserted into the locating hole 23 and the protective film is not sandwiched between the locating hole 23 and the locating pin 43. Copper, gold, nickel, etc. are, for example, employed as a material of metal film which the protective film is made of. In terms of protecting the locating hole 23 and the locating pin 43, it is preferable that metal film is made of gold, which has excellent ductility. Metal film which the protective film is made of may be composed of one layer and also be multi layers.

As shown in FIG. 2, on the lower surface of the glass substrate 20 on which the locating hole 23 is formed, the glass-substrate-side electrode 22 and wiring therefor is formed. It is preferable that, when wiring on the lower surface of the glass substrate 20, the protective film is formed together with the wiring. This simplifies the forming process of the protective film. In this case, metal film is made of metal having a high electric conductivity. When forming the protective film (metal film) together with wiring, it is preferable that the protective film is formed by stacking copper, nickel and gold from bottom to top, for example, in terms of wiring and soldering on electrodes.

In the first embodiment, the protective film 24 is formed along the edge of the locating hole 23, the protective film 24 is not formed on the bottom of the locating hole 23. Since the protective film 24 is not formed on the bottom of the locating hole 23, the top of the locating pin 43 becomes less likely to be in contact and positioning accuracy improves.

In the first embodiment, the glass substrate 20 is exposed in the annular pattern during the exposure process, and this prevents the protective film 24 from being formed in the bottom of the locating hole 23. It is therefore easy to remove the protective film 24 from the bottom of the locating hole 23.

It is desirable that the passivation film 25 is thicker than the glass-substrate-side electrode 22. When the thickness of the metal layer constituting the glass-substrate-side electrode 22 is 20 μm, the thickness of the passivation film 25 is set to 40 μm, for example. If the protective film 24 is formed together with the passivation film 25, the protective film 24 has a thickness as much as that of the passivation film 25, for example, 40 μm.

Since the external diameter of the protective film 24 is larger than the opening diameter of the locating hole 23, a part of the protective film 24 is formed on the surface of the glass substrate 20. For example, if the opening diameter of the locating hole 23 is 500 μm and the external diameter of the protective film 24 is 550 μm, the protective film 24 of 50 μm in width is formed around the locating hole 23 on the surface of the glass substrate 20. If the protective film 24 formed on the surface of the glass substrate 20 is sandwiched between the glass substrate 20 and the upper surface of the optical-path changer 40, a space of 40 μm (the thickness of the protective film 24) is made between the lower surface of the glass substrate 20 and the upper surface of the optical-path changer 40. In some cases, it is, however, desirable to reduce the space as much as possible.

In the first embodiment, the depth D of the recess 43B around the root of the locating pin 43 (see FIG. 6A) is set larger than the thickness of the protective film 24 (D>40 μm). And, the width W of the recess 43B of the locating pin 43 (see FIG. 6A) is set larger than the width of the protective film 24 formed on the surface of the glass substrate 20 (W>50 μm). Thus, in the first embodiment, the protective film 24 formed on the surface of the glass substrate is placed between the glass substrate 20 and the recess 43B of the optical-path changer 40 (see FIG. 10). Accordingly, the space between the lower surface of the glass substrate 20 and the upper surface of the optical-path changer 40 is not affected by the thickness of the protective film 24, and can be smaller than the thickness of the protective film 24.

In the first embodiment, because the glass substrate 20 is made of borosilicate glass (coefficient of linear expansion: $3.0\text{-}3.6\times10^{-6}/°\text{C.}$) and the optical-path changer 40 is made of polyetherimide resin (coefficient of linear expansion: $4.7\text{-}5.6\times10^{-5}/°\text{C.}$), the coefficient of linear expansion of the optical-path changer 40 is ten times as large as the coefficient of linear expansion of the glass substrate 20. The edge of the locating hole 23 is therefore subject to large force from the locating pin 43 at the time of change in temperature. Accordingly, even if temperature changes while the locating pin 43 is fitted into the locating hole 23, the force to which the edge of the locating hole 23 is subject from the locating pin 43 is mitigated by the protective film 24 which is formed on the edge of the locating hole 23. In addition, the region on the edge of the locating hole 23 which is subject to force is large (the area which is subject to stress is large). As a result, stress is distributed, and breakage of the glass substrate 20 and deformation of the locating pin 43 are prevented.

Second Embodiment

Figure 11:
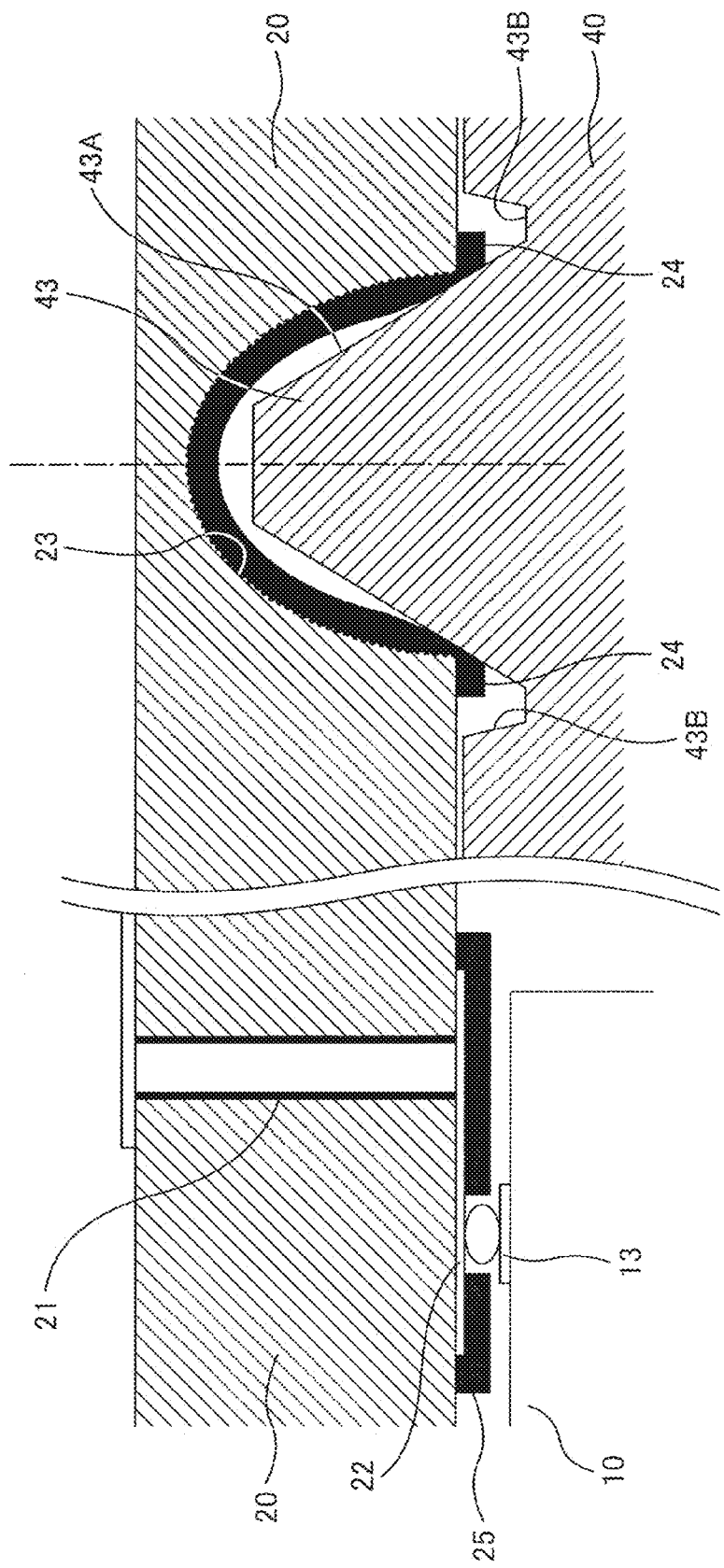
FIG. 11 is an explanatory diagram of the second embodiment.

FIG. 11 is an explanatory diagram of the second embodiment.

In the foregoing first embodiment, the protective film 24 is formed along the edge of the locating hole 23, and the protective film 24 is not formed on the bottom of the locating hole 23. As opposed thereto, in the second embodiment, the protective film 24 is formed on the inner surface of the locating hole 23, and the protective film. 24 is also formed on the bottom of the locating hole 23.

The damage layer which occurs when forming the locating hole 23 is formed wide on the inner surface of the locating hole 23 as well as the edge of the locating hole 23. Accordingly, forming the protective film 24 on the inner surface of the locating hole 23 can further prevent breakage of the glass substrate 20.

However, in the second embodiment, since the protective film 24 is also formed on the bottom of the locating hole 23, it is necessary to set the height of the locating pin 43 and the thickness of the protective film 24 so that the top of the locating pin 43 is not in contact with the protective film 24.

The protective film 24 may therefore be formed so that the thickness of the protective film 24 is thinner as it goes to the bottom of the locating hole 23.

Third Embodiment

Figure 12:
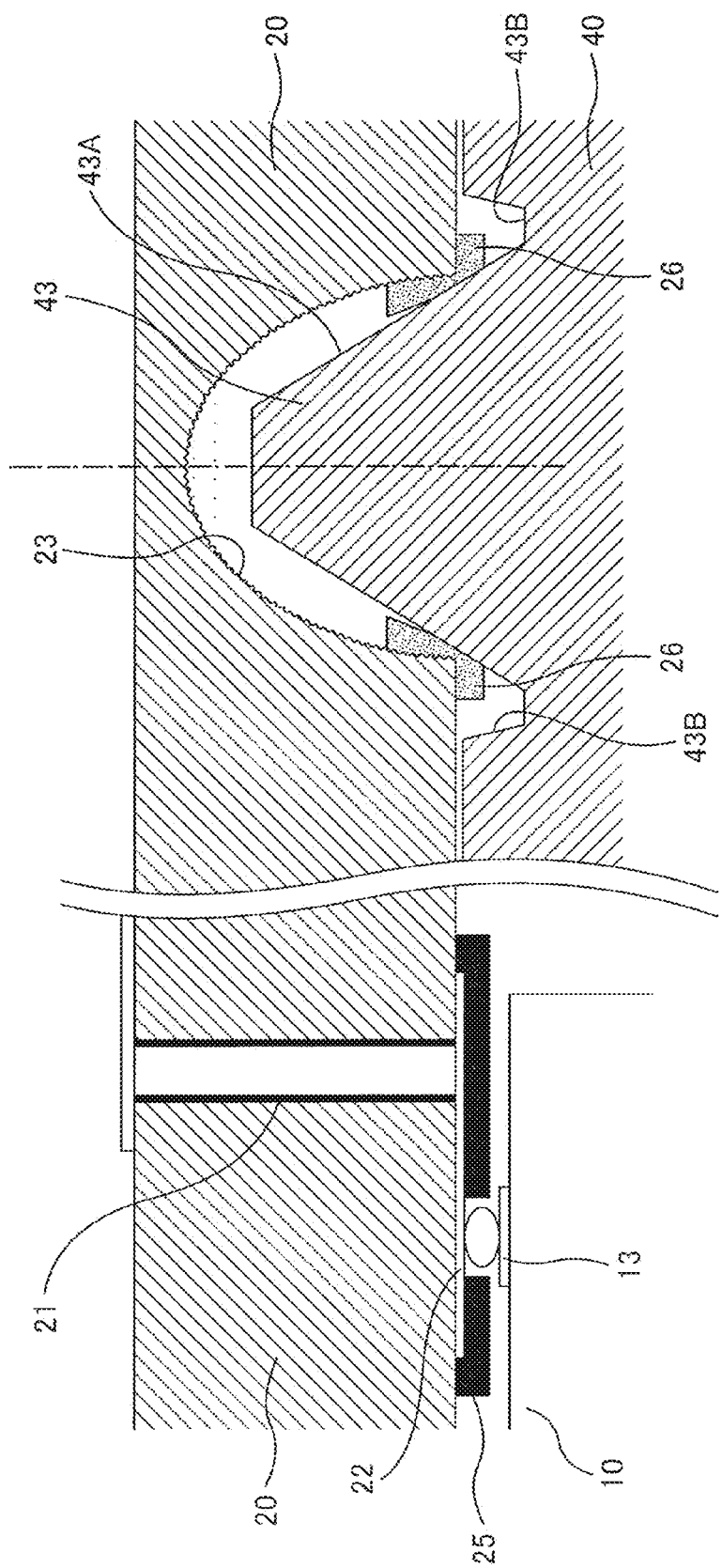
FIG. 12 is an explanatory diagram of the third embodiment.

FIG. 12 is an explanatory diagram of the third embodiment.

In the foregoing first embodiment, the protective film 24 is formed together with the passivation film 25. Accordingly, the protective film 24 is made of the same material as the passivation film 25 is, and has the same thickness as the passivation film 25. As opposed thereto, a protective film 26 of the third embodiment is made of a different material from the passivation film 25.

In the third embodiment, since the protective film 26 can be formed independently of the passivation film 25, it is possible to set freely the material and the thickness. This enables the material of the protective film 26 to be selected without consideration of close contact with the glass-substrate-side electrode 22.

Fourth Embodiment

Figure 13A:
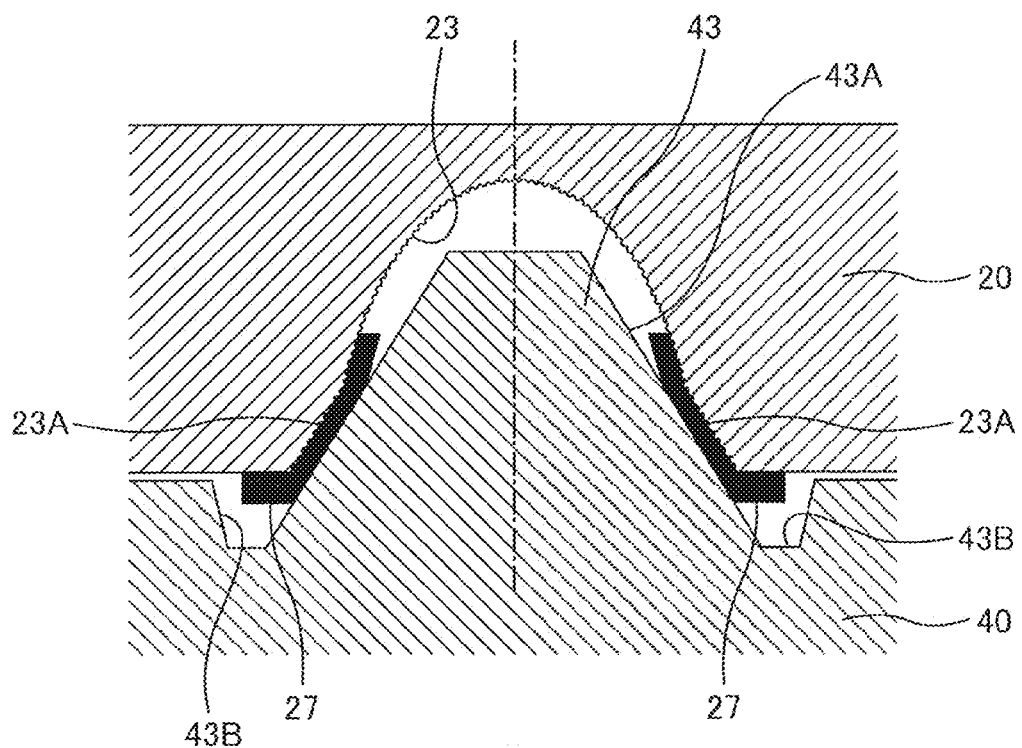
FIG. 13A is an explanatory diagram of the fourth embodiment.

FIG. 13A is an explanatory diagram of the fourth embodiment.

In the fourth embodiment, the edge of the locating hole 23 is chamfered, and a tapered surface 23A is formed on the edge of the locating hole 23. It is desirable that the angle of the tapered surface 23A is the same as that of the tapered surface 43A of the locating pin 43. As shown in the figures, the locating pin 43 is fitted to the locating hole 23 through the protective film 27, which is formed beforehand on the tapered surface 23A of the locating hole 23 of the glass substrate 20.

The protective film 27 is in contact with both the tapered surface 43A of the locating pin 43 and the tapered surface 23A (the chamfered surface) of the locating hole 23. Accordingly, the protective film 27 is sandwiched between the locating hole 23 and the locating pin 43.

In the fourth embodiment, the region which is subject to force from the locating pin 43 is larger (the area which is subject to stress is larger) than in the first embodiment. As a result, stress is distributed, and breakage of the glass substrate 20 and deformation of the locating pin 43 are further prevented.

Figure 13B:
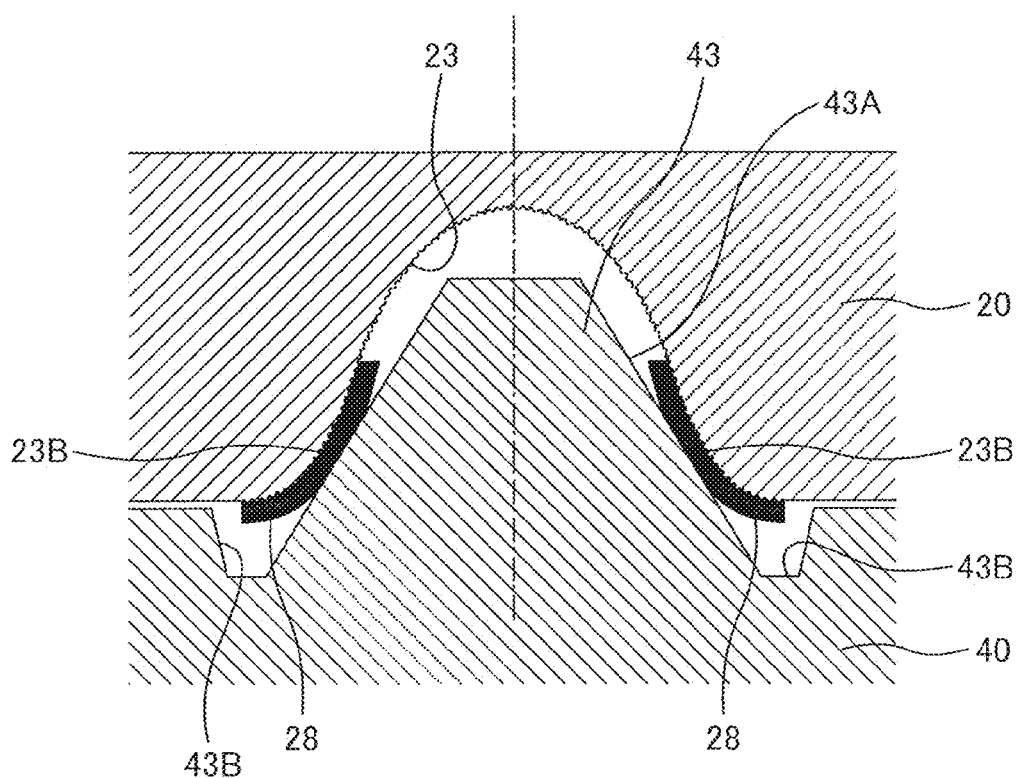
FIG. 13B is an explanatory diagram of a modified example of the fourth embodiment.

FIG. 13B is an explanatory diagram of a modified example of the fourth embodiment. In the modified example, the edge of the locating hole 23 is chamfered. In the modified example, the chamfered surface is a curved surface 23B, and is not a tapered surface.

Also in the modified example, the protective film 28 is in contact with both the tapered surface 43A of the locating pin 43 and the curved surface 23B (the chamfered surface) of the locating hole 23. Accordingly, the protective film 27 is sandwiched between the locating hole 23 and the locating pin 43.

Also in the modified example, the region which is subject to force from the locating pin 43 is larger (the area which is subject to stress is larger) than in the first embodiment. As a result, stress is distributed, and breakage of the glass substrate 20 and deformation of the locating pin 43 are further prevented.

In the first embodiment, the protective film 24 on the portions which are in contact with both of the locating hole 23 and the locating pin is likely to become thin, which is caused by the edge of the locating hole 23. As opposed thereto, in the fourth embodiment, since the protective film is formed on the chamfered surface, it is possible to prevent that the protective film on the portions which is in contact with both of the locating hole 23 and the locating pin 43 becomes thin. Accordingly, the stress is further mitigated, and breakage of the glass substrate 20 and deformation of the locating pin 43 are further prevented.

Fifth Embodiment

In the foregoing embodiments, the protective film 24 is formed along the entire edge of the locating hole 23 (see FIG. 7A). However, protective film does not have to be formed along the entire edge of the locating hole 23.

Figure 14:
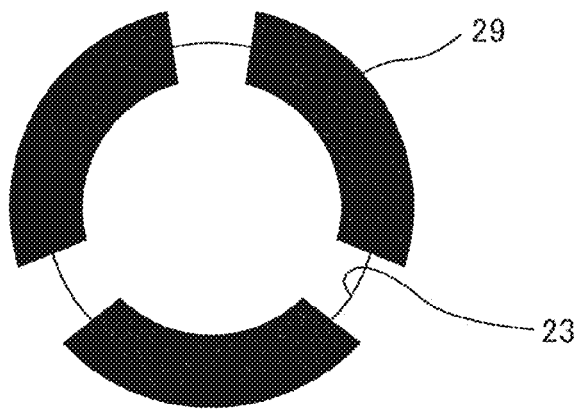
FIG. 14 is an explanatory diagram of the fifth embodiment, showing the periphery of the locating hole 23 as viewed from below.

FIG. 14 is an explanatory diagram of the fifth embodiment, showing the periphery of the locating hole 23 as viewed from below.

In the fifth embodiment, though protective film 29 is formed along the edge of the locating hole 23, the protective film 29 is not formed on a part of the edge of the locating hole 23. However, if the locating pin 43 is inserted into such a locating hole 23, the protective film 29 is in contact with both of the locating hole 23 and the locating pin 43 on the edge of the locating hole 23. In the fifth embodiment, the locating pin 43 is therefore fitted to the locating hole 23 through the protective film 29. This can prevent breakage of the glass substrate 20 and deformation of the locating pin 43. Further, if the protective film 29 is not formed on a part of the edge of the locating hole 23, the inner space of the locating hole 23 is not closed with the locating pin 43. That is, the part on which the protective film 29 is not formed serves as an air vent between the inside and the outside of the locating hole 23, and this prevents the internal pressure of the locating hole 23 from increasing, which applies load to the glass substrate 20. This produces a special effect at elevated temperature.

Sixth Embodiment

In the foregoing embodiments, the protective film 24 is formed beforehand on the edge of the locating hole 23 of the glass substrate 20. However, a protective film may be formed beforehand on the locating pin 43.

Figure 15:
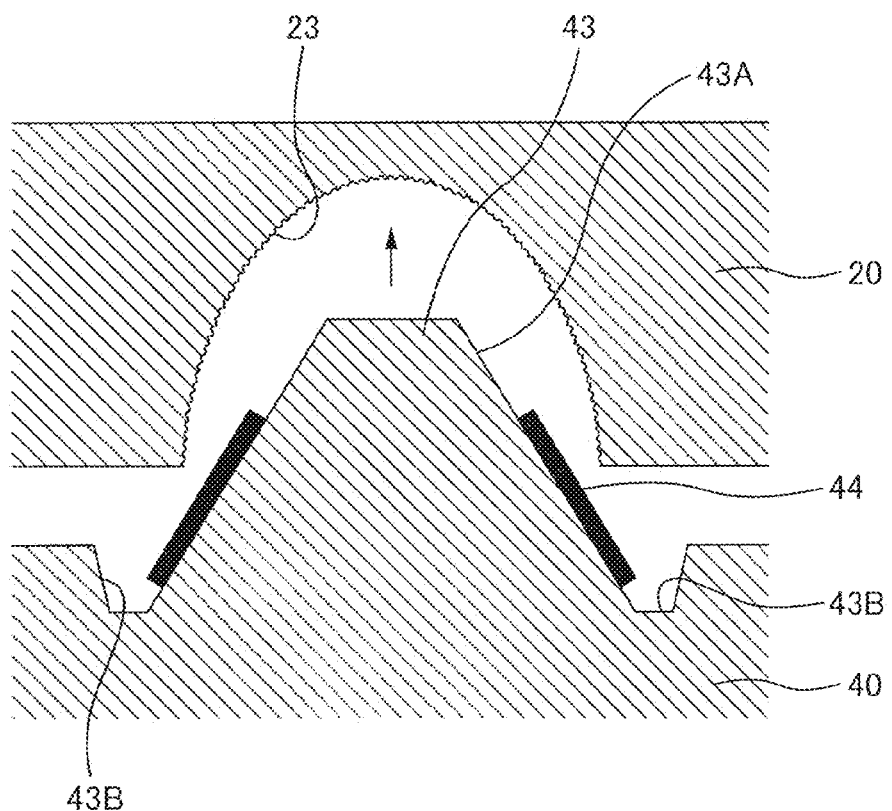
FIG. 15 is an explanatory diagram of the sixth embodiment.

FIG. 15 is an explanatory diagram of the sixth embodiment. In the sixth embodiment, protective film is not formed on the locating hole 23, but protective film 44 is formed beforehand on the tapered surface 43A of the locating pin 43. If such a locating pin 43 is inserted into the locating hole 23, protective film 44 is in contact with both of the locating hole 23 and the locating pin 43 on the edge of the locating hole 23. In the sixth embodiment, the locating pin 43 is therefore fitted to the locating hole 23 through the protective film 44. This can prevent breakage of the glass substrate 20 and deformation of the locating pin 43.

It should be noted that the sixth embodiment may be realized by applying adhesive which forms the protective film 44, onto the tapered surface 43A of the locating pin 43. This prevents breakage of the glass substrate 20 and deformation of the locating pin 43, and also realize that the optical-path changer 40 is bonded and fixed to the glass substrate 20.

Others

The above-described embodiment is merely for facilitating the understanding of the invention, but is not meant to be interpreted in a manner limiting the scope of the invention. The invention can of course be altered and improved as in the following description, for example, without departing from the gist thereof and includes functional equivalents.

Locating Hole and Locating Pin

Though the locating holes 23 are tapered non-through holes which are formed by sandblasting, the locating holes may be formed by any other process or may have other shape. A locating hole formed on the glass substrate 20 by means such as polishing or cutting has damage layer formed thereon, and this invention will be effective in the foregoing case.

For example, the locating hole does not have to have a tapered shape, and may be a hole having a uniform diameter as shown in FIG. 4B. Also, the locating pin does not have to have a truncated cone shape, and may have a conical shape shown in FIG. 5B or a cylindrical shape of uniform diameter shown in FIG. 5C. The locating hole does not have to be a non-through hole, and may be a through hole.

Figure 16:
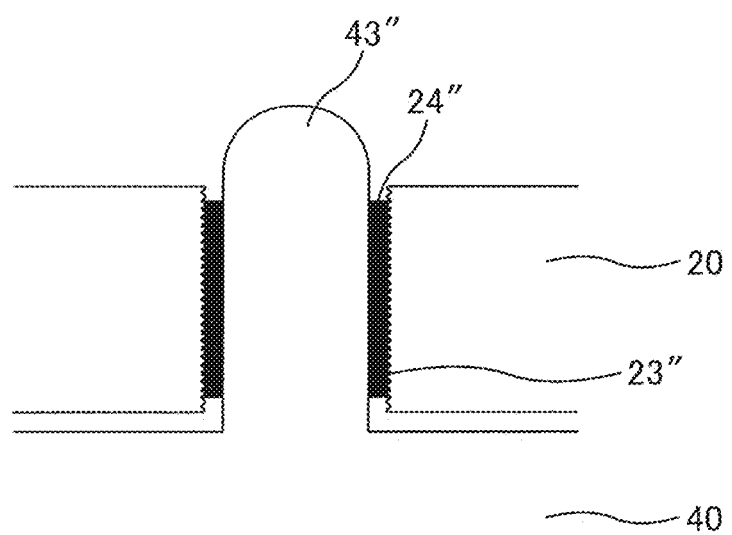
FIG. 16 is an explanatory diagram showing how the locating pin 43" which has a cylindrical shape of uniform diameter is fitted to a locating hole 23" (a through hole) having a uniform diameter.

FIG. 16 is an explanatory diagram showing how the locating pin 43" which has a cylindrical shape of uniform diameter is fitted to the locating hole 23" (a through hole) having a uniform diameter. The locating hole 23" is formed by drilling, and includes damage layer on its inner surface. The locating pin 43" is, however, fitted to the locating hole 23" through a protective film 24" so that the protective film 24" is in contact with both of the locating hole 23" and the locating pin 43". Accordingly, the region which is subject to force from the locating pin 43 is larger (the area which is subject to stress is larger) compared to the case without the protective film 24". As a result, stress is distributed, and breakage of the glass substrate 20 and deformation of the locating pin 43" are prevented.

However, if the locating hole is a through hole, flexibility in components and wiring on the surface of the glass substrate 20 decreases. In addition, a space between the locating hole 23 "and the locating pin 43" is needed due to tolerance, and this space causes alignment error.

Optical-Path Changer

In the foregoing embodiments, the locating pins 43 are formed in the optical-path changer 40. However, the optical component on which the locating pins 43 are formed is not limited to a component which supports the optical fibers 50. Any other optical component in which the alignment in relation to a glass substrate including a locating hole is adjusted using a locating pin may be employed.

Further, in the foregoing embodiments, the optical-path changer (an optical component) is made of resin. However, an optical component including locating pin does not have to be made of resin.

Furthermore, though the coefficient of linear expansion of the optical-path changer is different from the coefficient of linear expansion of the glass substrate in the foregoing embodiments, but the coefficient of linear expansions of them may be the same. However, In the case where the coefficient of linear expansions are different, the glass substrate is likely to be damaged when temperature changes. Accordingly, the protective film will particularly be effective in the foregoing case.

Optical Module

In the foregoing embodiments, the description is made using a QSFP optical module. However, the invention is not limited thereto. This invention can be applied to other types of optical modules (e.g. CXP, SFP, etc.).

REFERENCE SIGNS LIST

1 optical module,
1A housing,
2 cage,
2A connector,
3 heat sink,
10 circuit board,
11 connecting section,
12 receiving window,
13 circuit-board-side electrode,
20 glass substrate,
21 through via,
22 glass-substrate-side electrode,
23 the locating hole,
23A recess,
24 protective film,
25, passivation film,
26-29 protective film,
31 light-emitting section,
31A light-emitting-section-side electrode,
31B light-emitting surface,
32 drive element,
40 optical-path changer,
41 lens section,
42 reflecting section,
43 the locating pin
43 A tapered surface,
43B recess,
44 protective film,
50 optical fiber

The invention claimed is:

1. An optical module, comprising:
a glass substrate
that includes an optical-electric-conversion element,
that is transparent to either one of light emitted from the optical-electric-conversion element and light received by the optical-electric-conversion element, and
in which a locating hole is formed; and
an optical component in which a locating pin is formed,
wherein the locating pin has a tapered surface and is fitted to the locating hole through a protective film,
a recess is formed around a root of the locating pin in the optical component,
the glass substrate and the optical component being positioned by fitting the locating pin to the locating hole through a protective film so that the protective film is in contact with an edge of the locating hole and the tapered surface of the locating pin, and
the protective film is formed beforehand on the edge of the locating hole of the glass substrate, the protective film formed on the surface of the glass substrate being placed between the glass substrate and the recess of the optical component, and a part of the protective film being formed on the surface of the glass substrate.

2. An optical module according to claim 1, wherein the locating pin is fitted to the locating hole through the protective film, the protective film being formed beforehand on an edge of the locating hole of the glass substrate.

3. An optical module according to claim 2, wherein irregularities of the glass substrate on the edge of the locating hole are covered by the protective film, and an opening of the locating hole is composed of the protective film.

4. An optical module according to claim 2, wherein the protective film is resin film.

5. An optical module according to claim 2, wherein the protective film is resin film that is formed together with a passivation film of the glass substrate.

6. An optical module according to claim 2, wherein a through via is formed on the glass substrate, and the protective film is formed by means in which film is laminated on the glass substrate by vacuum lamination.

7. An optical module according to claim 2, wherein the protective film is metal film.

8. An optical module according to claim 7, wherein the protective film is metal film that is formed together with wiring of the glass substrate.

9. An optical module according to claim 2, wherein the locating hole is a non-through hole, and the protective film is not formed on a bottom of the locating hole.

10. An optical module according to claim 9, wherein the protective film is formed by forming a photosensitive resin layer on a surface of the glass substrate on which the locating hole is formed and by exposing and developing the resin layer.

11. An optical module according to claim 2, wherein the protective film is formed on an inner surface of the locating hole.

12. An optical module according to claim 1, wherein the locating hole is a tapered non-through hole, and the locating pin has a truncated cone shape.

13. An optical module according to claim 1, wherein a coefficient of linear expansion of the glass substrate is different from a coefficient of linear expansion of the optical component.

14. An optical module, comprising:
a glass substrate
that includes an optical-electric conversion element,
that is transparent to either one of light emitted from the optical-electric-conversion element and light received by the optical-electric-conversion element, and
in which a locating hole is formed; and
an optical component in which a locating pin is formed,
wherein the locating pin has a tapered surface,
the glass substrate and the optical component are positioned by fitting the locating pin to the locating hole through a protective film so that the protective film is in contact with an edge of the locating hole and the tapered surface of the locating pin,
an edge of the locating hole is chamfered, and
the protective film is in contact with the tapered surface of the locating pin and a chamfered surface of the locating hole, and a part of the protective film being formed on the surface of the glass substrate.

* * * * *